W. S. GUINNESS.
Sewing Machine.
No. 3,281. Reissued Feb. 2, 1869.
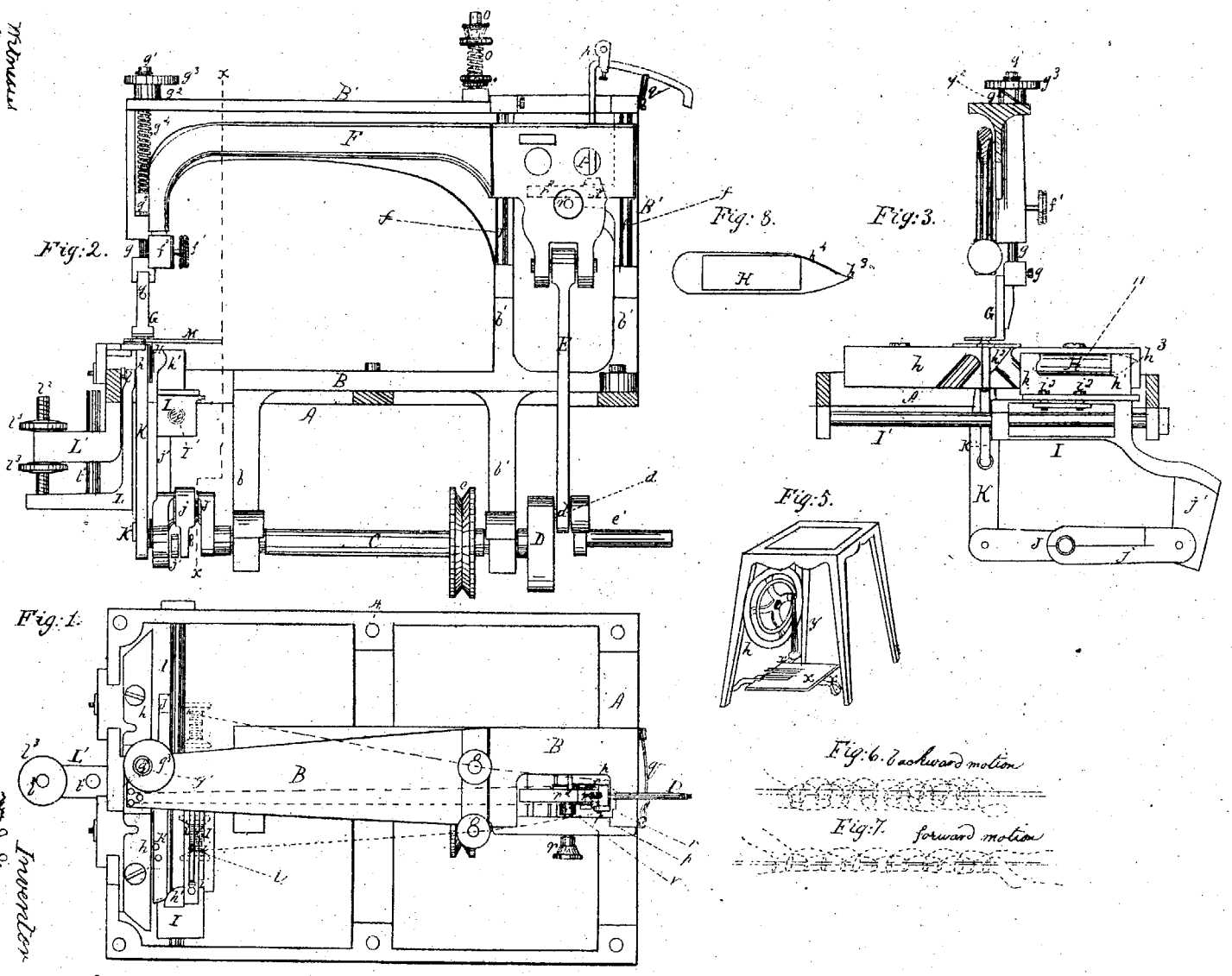
THE ECKERT LITHOGRAPHING CO., WASHINGTON, D. C.

United States Patent Office.

WILLIAM STUART GUINNESS, OF LONDON, ENGLAND, FOR HIMSELF AND A. G. SEAMAN, OF NEW YORK, N. Y., ASSIGNEE OF WILLIAM S. GUINNESS.

*Letters Patent No.* 41,916, *dated March* 15, 1864; *antedated March* 9, 1864; *reissue No.* 3,281, *dated February* 2, 1869.

IMPROVEMENT IN SEWING-MACHINES.

The Schedule referred to in these Letters Patent and making part of the same.

*To all whom it may concern:*

Be it known that I, WILLIAM STUART GUINNESS, formerly of Mount Vernon, in the county of Westchester, and State of New York, but now residing in London, England, have invented certain new and useful Improvements in Sewing-Machines, of which the following is a full, clear, and exact description, reference being had to the accompanying drawings, which make part of this specification, and in which—

Figure 1 represents a plan or top view of so much of a sewing-machine, in which my improvements are embodied, as is necessary to illustrate the invention herein claimed.

Figure 2 represents a view in elevation of the machine, with a portion of the frame in section;

Figure 3 represents a vertical transverse section through the same, at the line *x x* of fig. 2, looking toward the needle;

Figure 4 represents a view, in perspective, of my improved treadle;

Figure 5 shows the stitch formed by the backward movement of the mechanism, when using two needles; and Figure 6, the regular forward stitch of the machine, with two needles. When one needle is used, the ordinary shuttle-lock stitch is made.

Figure 7 represents a view of the shuttle turned upside down, showing the inner or working-face.

The improvements herein claimed consist—

First, in a novel method, hereinafter described, of combining, in a sewing-machine, a driving-shaft, arranged longitudinally beneath the table, a reciprocating needle-arm, arranged longitudinally above the table, and always remaining parallel with the driving-shaft, and a vertically-moving presser-foot, with a shuttle and a feed-bar, arranged below the table, and moving transversely to the needle-arm and driving-shaft.

Second, in a novel method, hereinafter explained, of feeding the fabric to the needle, and of varying the length of the stitch.

Third, in a novel method of combining, with a sewing-machine, a vibrating lever, to take up the slack of the needle-thread, as hereinafter set forth.

Fourth, in a novel method of mounting the shuttle in a reciprocating slide, or holder, as hereinafter described, whereby the friction of the shuttle in the race, and its consequent wear, are diminished.

Fifth, in a novel method of combining the needle and the shuttle, operating substantially as hereinafter set forth, with a race-way, having one side of the slot in which the needle plays cut away, to or below the bottom of the shuttle, to form a recess for the reception of the loop of the needle-thread, while the shuttle is passing through said loop, and thus avoid friction on the thread.

Sixth, in a novel method, hereinafter described, of rendering the shuttle-holder adjustable.

Seventh, in a novel method of constructing the treadle of a sewing-machine, to adapt it to being worked from either side or end of the machine.

In the accompanying drawings, which represent all my improvements as embodied in one machine, the mechanism is shown as mounted in a horizontal frame, A, by preference a skeleton one, and of iron.

A vertical frame, B, by preference, similar in material and construction to the frame A, is rigidly connected with and supported by the horizontal frame.

A driving-shaft, C, in this instance is shown as arranged horizontally beneath the frame, and turning in suitable bearings, in stirrups or down-hangers *b*. This shaft may be rotated in either direction by power applied in the usual way, either to the driving-pulley *c*, or to the crank *c'*.

In fig. 4, I have shown one convenient mode of driving this shaft, by means of a fly-wheel, Z, operated by a crank and pitman, Y.

The lower end of this pitman fits with a ball-and-socket joint, *y*, on an arm, *x*, secured to a foot-board, X, rocking on an axis, *x'*, or fulcrum X'.

The feet or supports of this axis rest on the floor, independently of the frame, and the ball-and-socket joint permits the foot-board to be turned without interfering with its working. This foot-board is slotted parallel to its axis.

The arm *x* is secured to this board by bolts passing through the slots, and provided with nuts, by which means the arm may be adjusted along the board.

By this device I am enabled to drive the machine from either side or end, so that the operator is not obliged always to sit in the same relative position to the machine.

An overhanging arm, B', mounted on standards *b'*, overhangs the bed-plate or table.

The needle-arm F is moved vertically, parallel with this overhanging arm, on guides *f*, and is reciprocated by means of a pitman, E, pin-jointed at its upper end to the needle-arm, and at its lower end on a wrist-pin or crank, *d*, on a balance-wheel, D, on the driving-shaft C.

By this arrangement, all the parts of the working-mechanism, above the table, which require lubrication, are located at the end of the machine farthest from the work, and below the thread, so that any danger of soiling the work or thread is obviated.

The nose of the needle-bar is flat-sided, and provided with vertical parallel grooves in its front face.

A clamp or band, $f^2$, surrounds this nose, and is held by a set-screw, $f^1$.

This arrangement enables me to use not only any ordinary sewing-machine straight needle, but even the ordinary needles of commerce, used for hand-sewing.

In using ordinary hand-needles, I secure them in the clamp, with their eyes downward, and perforate the cloth with their blunt ends, which, for soft fabrics, answers a very good purpose.

The clamp is also designed to receive two or more needles, arranged side by side in the line of the stitching.

For fine work, when more than one needle is used, the second needle, or that farthest from the end of the shuttle, should be set about one thirty-second part of an inch below the other, but both needles enter and leave the cloth together.

The presser-foot G has a smooth under surface, and moves vertically endwise, in guides, in the overhanging arm B′. It slides on its rod $g^1$, and is adjusted by means of a set-screw, $g$, to accommodate different thicknesses of material.

The presser-foot is elevated, and retained in its elevated position, by means of a cam-p ane, $g^2$, fixed on the arm B′, and corresponding cam $g^3$, fixed and turning on the rod $g^1$.

The presser-foot is depressed by a spiral spring, $g^4$, the tension of which may be varied by means of a set-screw, $f^5$, passing through a slot in the overhanging arm, and acting on the nut $g^5$ on the rod $g^1$.

The shuttle H reciprocates horizontally and transversely to the needle-arm, but parallel to the line of seam, with its straight side in contact with the race-way $h$, and is driven by a shuttle-driver, $h^1$, by preference, made of wood, as being less noisy than metal.

The shuttle-driver is secured in a shuttle-holder, made of wood, which consists of a frame, I, sliding on a rod, I′, transverse to the frame, and having slots $i'$, fig. 1, in it, transverse to its line of motion.

The shuttle-driver is provided with slots $i'$, parallel to its line of motion, and the shuttle-holder and driver are connected by set-screws $i^2$, fig. 3, passing through these slots. I am thus enabled to adjust the shuttle-holder relatively to the race.

The shuttle, it will be observed, does not run in a race-way in the usual manner, but is held by the holder, its face only coming in contact with the race-way.

The shuttle is driven by a crank, J, on the driving-shaft C, connected by a pitman, $j$, with an arm, $j'$, depending from the shuttle-holding frame I, as shown in fig. 3. The shuttle, by this means, is caused to reciprocate once for every revolution of the driving-shaft C, each reciprocation consisting of a quick forward movement, a slight pause as the crank $j$ passes its dead-centre, a rapid return, and another slight pause before beginning its next forward movement, while the crank passes the centre on that side.

All the mechanism, it will be observed, is driven by means of cranks and connecting-rods, directly from the driving-shaft.

The shuttle, as shown in figs. 3 and 7, is made with a sharp end, or snout, $h^3$, but enlarges rapidly. I prefer to make this snout above the centre line of the shuttle.

By this mode of construction, I am enabled to use comparatively short needles, and to work with a short stroke of the needle, as it is only necessary for the needle to descend low enough for the snout of the shuttle to enter the loop, which is then expanded by the action of the shuttle itself, which, in passing through the loop, draws down thread enough to envelop itself.

As, in my machine, the shuttle passes through the loop of the needle-thread while the needle is rising, the loop is, to some extent, carried in the direction in which the shuttle is moving. Now, in order to prevent the thread being rubbed between the face of the shuttle and the race-way, I cut away one side of the slot, in which the needle plays, down to or below the bottom of the shuttle, as shown at $h^2$, fig. 3, thus forming a recess to receive that part of the loop which otherwise would rub between the shuttle and the race-way.

This slot is also important, as it enables me to let the shuttle run in close contact with the race, and thus avoid rattling. I also cut away the edge $h^4$, fig. 7, of the shuttle, as I find it facilitates the forming of the loop by preventing the thread from catching between the shuttle and race.

An intermittent progressive motion is imparted to the cloth by means of a feed-bar, K, pivoted, at its lower end, eccentrically on the driving-shaft, and vibrating on a fulcrum, $l$.

The fulcrum-pin $l$ is mounted on a bracket, L, moving vertically on a guide, $l^1$, in a ledge, $L^1$, projecting from the frame A, and held, at any desired height, by means of a screwed spindle, $l^2$, and jam-nuts, $l^3$.

The fulcrum-pin $l$ enters a longitudinal slot, $k^2$, fig. 3, in the feed-bar, and as it is raised or lowered therein, of course varies the length of the lateral vibration of the feed-bar, the vertical movement of which is received from the crank, as hereinbefore explained. I thus secure any desired adjustment of the feed-motion.

By the devices above described, the feed-bar is caused, at proper intervals, to rise against the cloth, which is held down by the presser-foot G, and feed the cloth forward, and then to descend, out of contact with the cloth, to its central or lowest point, and again to rise and move forward as before.

As my feed has no points or teeth to catch the cloth, the finest and most delicate fabrics can be fed with it. This feed also possesses the advantage of working either way with equal facility.

A stitching-plate or throat-plate, M, is secured upon the frame, just below the needle-arm, and perforated with a proper hole for the passage of the needle or needles.

The needle-thread is supplied from spools, shown in red in fig. 1, turning on pivots on the overhanging arm $B^1$.

The threads pass from the spools through eyes or slots in screwed spindles, O, provided with spring-clamps, $o$, to regulate the tension.

From these clamps the threads pass through eyes, $p$, on an arm or thread-regulator, P, vibrating on a fulcrum, $r$, fig. 1.

This arm is vibrated by means of a boss, $r^1$, on the needle-bar, which strikes a projection, $r^2$, on the fulcrum, as the needle-bar rises, and thus takes up the slack thread. (See fig. 2.)

The arm P may be vibrated the other way by a weight, or by a spring, $q$, bearing on the under side of the arm P, as shown in fig. 2, in order to take up the slack of the thread above the cloth.

From the eyes $p$, the thread passes forward to holes $s$, in the overhanging frame, and thence to the needles.

The crank-pin $d$, which drives the needle-bar, and the crank $k$, which actuates the feed-bar, are both arranged on the same side of the driving-shaft, and in the same radial line.

The crank J, which actuates the shuttle, is at right angles to the other cranks; consequently the machine may be run equally well either way, as, when the cranks $d$ $k^1$ are in their lowest positions, they will act in the same manner, whichever way the driving-shaft is turned, and the crank J, being at right angles to them, and having to give motion to the shuttle, which works at right angles to the needle, will also act on the shuttle in the same manner, whichever way the axis is turned.

The operation is as follows:

The machine having been properly threaded and adjusted, the fabric is secured upon the stitching-plate by the presser-foot, and the driving-shaft is rotated in either direction. In figs. 1 and 2, the needle-bar is shown as just commencing its descent. The needle penetrates the fabric until its eye is slightly below the snout of the shuttle. As the needle rises, the snout $h^2$ enters the loop of the needle-thread, and envelops the shuttle with it, by expanding the loop as it passes through. As it does this, that part of the loop which ordinarily would rub between the shuttle-face and the race-way, slides along the recessed edge $h^4$, and enters the slot or recess $h^2$. As soon as the shuttle has passed through the loop, (carrying its thread with it,) the latter is tightened by the continued ascent of the needle, and the action of the boss $r^1$ on the tension-lever P. The cloth is then fed along a distance sufficient for the next stitch, and the operation, above described, is repeated.

It will be observed that, in my machine, both the needle and the shuttle move simultaneously and continuously, and that the shuttle is being passed through the loop of the needle-thread without pause, while the needle is uninterruptedly rising.

What I claim, is—

1. The combination of the driving-shaft arranged lengthwise beneath the frame, the reciprocating needle-arm arranged longitudinally above the table, and always remaining parallel with the driving-shaft and the presser-foot, with the shuttle and feed-bar arranged below the table, and moving transversely to the needle-arm and driving-shaft, as and for the purposes specified.

2. The combination, substantially as set forth, of the longitudinally-slotted feed-bar, the fulcrum-pin $l$, and its support L, with the ledge $L^1$, guide $l^1$, and adjusting-screw $l^2$, whereby the feed can be varied at pleasure.

3. The thread-regulator or, take-up, P, constructed, arranged, and operating as set forth.

4. The combination, with the shuttle, of the adjustable holder and reciprocating carrier, as set forth.

5. The combination of a needle and a shuttle, operating substantially as described, with a needle-way cut away at one side, to or below the bottom of the shuttle, for the purposes specified.

6. The combination, substantially as set forth, with the reciprocating slide I, of the adjustable holder $h^5$, whereby shuttles of various sizes may be employed.

7. The combination, substantially as set forth, of the oscillating slotted treadle X, the adjustable arms $x$, the ball-and-socket joint, the pitman, and the balance-wheel, for the purposes specified.

Witnesses: W. S. GUINNESS.

S. J. GORDON,

JOSEPH MURRAY.